(12) United States Patent
Henry

(10) Patent No.: US 8,629,882 B2
(45) Date of Patent: Jan. 14, 2014

(54) DIGITAL COLOR CHIP

(75) Inventor: Michael J. Henry, Hinckley, OH (US)

(73) Assignee: PPG Industries Ohio, Inc., Cleveland, OH (US)

(\*) Notice: Subject to any disclaimer, the term of this patent is extended or adjusted under 35 U.S.C. 154(b) by 1063 days.

(21) Appl. No.: 12/129,022

(22) Filed: May 29, 2008

(65) Prior Publication Data
US 2009/0295823 A1    Dec. 3, 2009

(51) Int. Cl.
*G09G 5/02*    (2006.01)

(52) U.S. Cl.
USPC ........................................................ 345/593

(58) Field of Classification Search
USPC ............................ 707/722; 356/421; 345/593
See application file for complete search history.

(56) References Cited

U.S. PATENT DOCUMENTS

| | | |
|---|---|---|
| 5,579,031 A | 11/1996 | Liang |
| 5,761,392 A * | 6/1998 | Yacoub et al. ................. 358/1.9 |
| 6,122,391 A | 9/2000 | Ringland |
| 6,539,325 B1 | 3/2003 | Numata et al. |
| 6,714,924 B1 | 3/2004 | McClanahan |
| 6,914,613 B2 | 7/2005 | Marchand |
| 7,145,656 B2 | 12/2006 | Rodrigues |
| 7,747,615 B2 * | 6/2010 | Rodrigues et al. ............ 707/722 |
| 2002/0152049 A1 * | 10/2002 | Lewis ........................... 702/127 |
| 2005/0128484 A1 | 6/2005 | Rodrigues et al. |
| 2006/0183458 A1 | 8/2006 | Sena |
| 2007/0003691 A1 | 1/2007 | Rodrigues |
| 2007/0032965 A1 | 2/2007 | McClanahan |
| 2007/0035554 A1 | 2/2007 | McClanahan |
| 2007/0097119 A1 | 5/2007 | Steenhoek |
| 2007/0292608 A1 * | 12/2007 | Rodrigues ..................... 427/140 |
| 2009/0019086 A1 * | 1/2009 | Prakash et al. ............. 707/104.1 |

\* cited by examiner

*Primary Examiner* — Edward Martello
(74) *Attorney, Agent, or Firm* — Robert Lenart

(57) ABSTRACT

A computer-implemented method of color matching a repair paint formula is disclosed. The method includes steps of inputting a color code for a vehicle paint; searching a computer database for formulations associated with the color code; selecting a plurality of the formulations for display; displaying digital images of the selected formulations at a plurality of viewing angles; determining one of the displayed formulations as a best match to the vehicle paint; and identifying the formulation for the best match.

19 Claims, 2 Drawing Sheets

DIGITAL COLOR CHIP

FIELD OF THE INVENTION

This invention relates to a method and system for displaying color chips on a monitor.

BACKGROUND OF THE INVENTION

When a vehicle is designed, the vehicle paint has an original formulation that is specified for production, referred to as the prime formulation for that paint. However, the color of paint applied to vehicles in a manufacturing setting tends to vary. The variability can be observed both within a single production facility when the components of the paint composition change slightly between production runs. This is typically seen as a drift in paint color of vehicles manufactured at a particular production facility. In addition, even more significant differences in the paint color can be observed between vehicles manufactured at different production facilities of the same vehicle manufacturer. Each of the production facilities may receive a different lot for the paint components, including the pigments and other colorants that are added to the paint, thereby imparting differences in the paint color between production facilities.

When a vehicle undergoes repair, a repair paint, which should match the original paint, is applied to the vehicle. However, due to color shifts in the original paint applied to vehicles during manufacturing, it is difficult to match the repair paint to the original paint. Differences between the original vehicle paint and a repair paint on the vehicle can be perceived. The color variations of paint produced by original equipment manufacturers are difficult to color match in the multitude of auto body repair shops that repaint vehicles.

Vehicles typically include a series of identification tags, including a color code that refers to the original paint formulation. Due to the paint color variation, each color code generally corresponds to a plurality of variant formulations that are associated with the prime formulation. Repair paint personnel must select the paint formulation from the plurality of formulations associated with a single color code that best matches the paint of the vehicle undergoing repair.

A typical color matching process in a repair shop occurs several days after the repair process is initiated. Traditionally, a painter is faced with selecting one of many paint formulations for matching a particular color on the vehicle undergoing repair. The paint formulations may be embodied in physical paint chips of the prime formulation and some, but not all, variants. The painter may compare the color of the paint chips held by hand up against a vehicle undergoing repair to visually select the paint chip that most closely matches the color of the paint on the vehicle undergoing repair. This technique requires the auto body repair shop to maintain a large library of color chips for all colors that the repair shop expects to require and depends on the ability of the painter to compare the multitude of paint chips to the color of the paint on the vehicle undergoing repair.

SUMMARY OF THE INVENTION

The present invention is directed to a computer-implemented method of color matching a paint formulation for repairing a vehicle comprising: (a) identifying a color code for a vehicle paint; (b) selecting a color reference chip associated with the color code; (c) visually determining a color shift between the paint on the vehicle and the color reference chip; (d) searching a computer database for paint formulations associated with the color code; (e) selecting a plurality of the paint formulations for display; (f) displaying paint images of the selected formulations at a plurality of viewing angles; (g) identifying one of the displayed paint images that best matches the vehicle paint while accounting for the color shift; and (h) identifying the paint formulation for the best matched paint image.

The present invention also includes a computer product for color matching a repair paint formulation to a vehicle paint comprising: (a) a computer-implemented color code database, the database associating color codes with paint formulations; (b) a color code input device configured to initiate a search in the database for the color code; (c) a paint formulation output device configured to display paint formulations located in the search for the color code; and (d) an image display device configured to display color images of the paint formulations, wherein the color images are digital images of formulation panels.

DETAILED DESCRIPTION OF THE INVENTION

The present invention is described in relation to a system for exhibiting digital color images of painted panels on a display screen. The color images are particularly suited for displaying paint formulations for vehicles undergoing auto body repair in order to select a paint formulation for repairing a vehicle. Photographic images can provide a representation of the actual metallic pattern, texture and particle size of color effect pigments (such as flake pigments) in the color formulation. However, this is not meant to be limiting. The present invention may also be used with solid color formulations, not having color effect pigments. The present invention is also applicable to displaying color samples and selecting paint formulations in other applications, including architectural paints, consumer products and industrial coatings which may or may not include color effect pigments.

Figure 1:
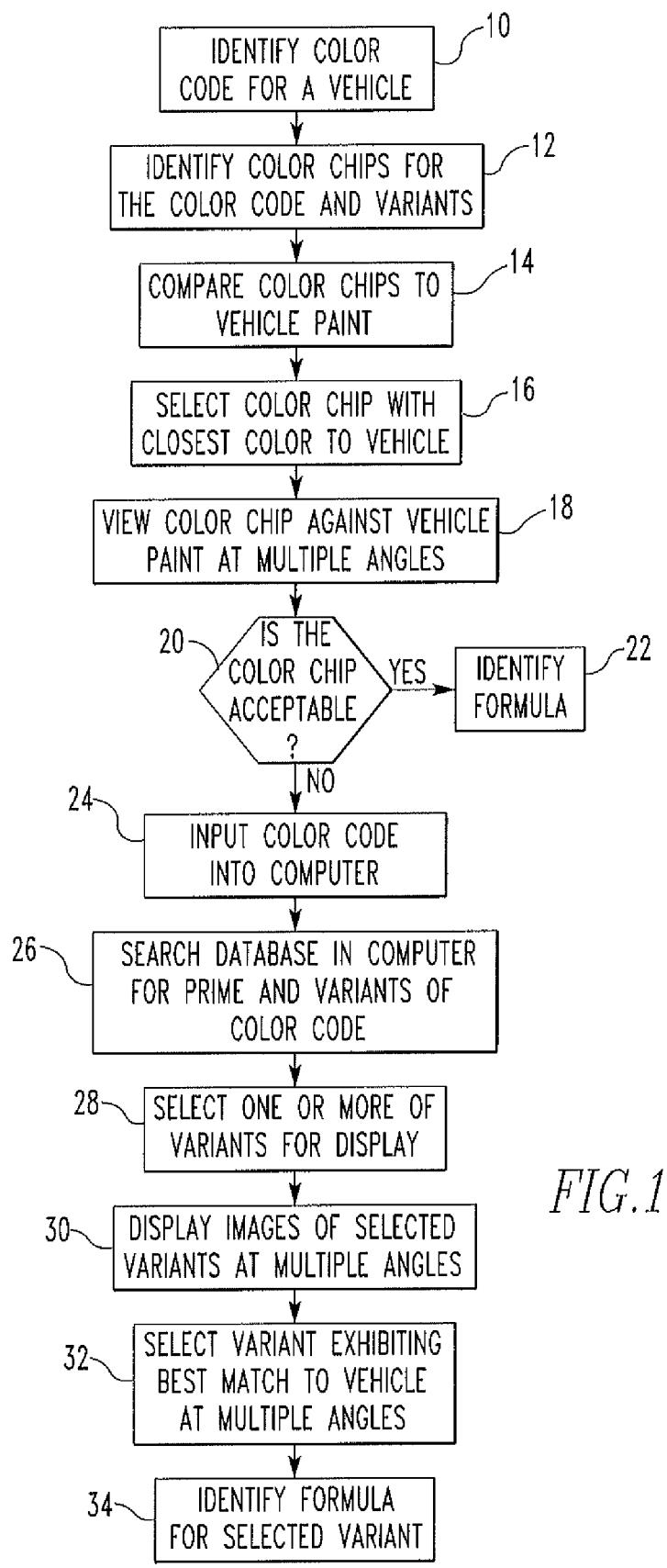
FIG. 1 is a flow chart of the method of an embodiment of the present invention.

Referring to FIG. 1, the method of the present invention utilizes a vehicle manufacturer color code for a vehicle undergoing repair, physical color chips that represent color formulations for the color code, and digital photographs of known formulations associated with the color code. By color chip it is meant physical chips coated with particular paint formulations. In Step 10, the auto body repair shop personnel identify the color code for the vehicle. The color code may be provided on the vehicle, such as on a door sticker or on a plaque positioned somewhere in the vehicle. Alternatively, the color code may be specified in color production books or paint chip books or the like. In Step 12, the color chips for the color code, including the prime and at least some variants are identified. In Step 14, the body shop personnel compare the identified color chips to the vehicle paint at various angles by placing the color chips near to or against the vehicle to select (in Step 16) the color chip with the closest color to the vehicle. The selected color chip is viewed at multiple angles against the vehicle in Step 18. If the color chip is determined to be acceptable when viewed against the vehicle at multiple angles, as at 20, the formula for that color chip is identified in a color retrieval system, as in Step 22.

More likely though, the selected color chip is not acceptable when compared to the vehicle at multiple viewing angles, i.e. there is a discernable shift or difference in color between the selected color chip and the vehicle paint. In that circumstance, the selected color chip serves as a reference color chip from which the color may be adjusted as follows. In step 24, the color code is entered into a color retrieval system and a search is initiated in a database thereof containing known paint formulations for that color code. Software of the color retrieval system searches for the prime formulation and variants of the color code. The results of the database search are displayed on an output device such as on a computer monitor, as a list of the prime and variants for the color code. For each formulation, the list includes an identification code or variant designation for the type of formulation (e.g., prime, variant or special) and a symbol indicating the color shift direction of the formulation versus the prime color. The color shift direction is an indication of the degree to which the color of that formulation differs from the prime formulation, such as being greener than the prime when viewed on flash or bluer than the prime when viewed on flop. The color shift direction may be used by the painter to select formulations in the list that the painter believes will more closely match the paint of the vehicle undergoing repair based on a visual assessment of the vehicle paint, the appearance of the reference color chip at multiple viewing angles and a determination that a particular color shift direction will help.

One or more of the prime and variant formulations are selected for display in Step 28. In Step 30, the computer system displays images on a display device (such as a display screen of a computer monitor) of the selected prime and variants at multiple angles. The images of the selected prime and variants may be digital photographs of the formulations, taken at multiple viewing angles as detailed below. At Step 32, the user selects the paint image of the prime or variant that exhibits the best match to the vehicle color at multiple viewing angles, taking into account the color shift discerned between the reference color chip and the vehicle paint. The database provides the formulation of the selected best match paint images in Step 34. The formulation may then be prepared for application to the vehicle.

Figures 2, 3, 4:
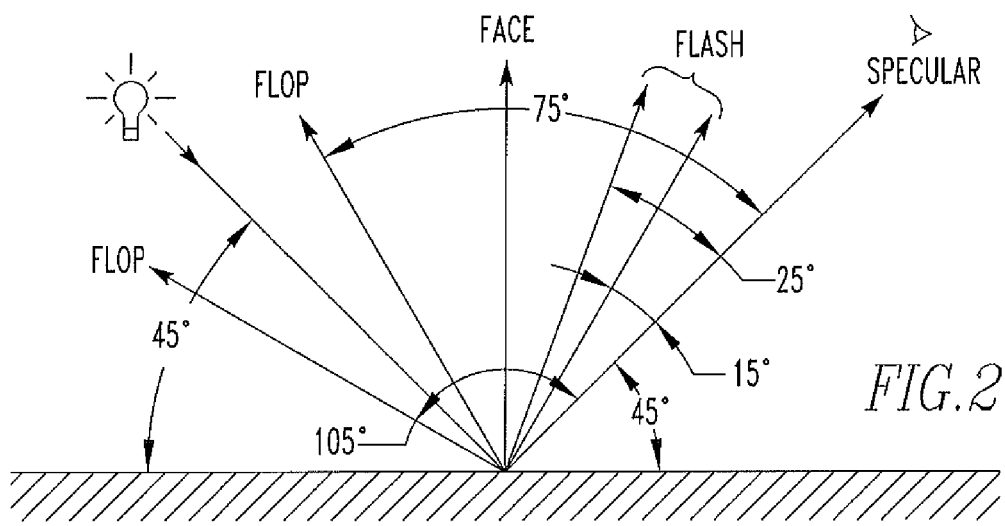
FIG. 2 is a schematic of the specular angles that are used in an embodiment of the method of the present invention.
FIG. 3 is a schematic view of a computer monitor displaying digital color chips according to an embodiment of the present invention.
FIG. 4 is a schematic view of a computer monitor displaying digital color chips according to another embodiment of the present invention.

The paint images displayed on a color monitor according to the present invention are digital photographs of formulation panels of the prime and variants. Many paint formulations include color effect pigments or other additives (such as metal and interference flakes) that create a gonioapparent effect in the paint formulation. To create the digital photographs, the prime and variants of paint formulations associated with the color code are prepared, coated onto a substrate and photographed at a plurality of viewing angles, optionally using a light source directed at the substrate at a plurality of illumination angles. In one non-limiting example, FIG. 2 depicts the specular and non-specular angles at which light reflects when light strikes a coated surface. When viewed at normal to the surface (i.e., 45° from a specular angle), the coated surface is considered to be viewed at the mid-aspecular angle or on face. Viewing the coated surface at 15° (or 25°) from the specular angle is considered to be viewing the coated surface at the near-specular angle or on flash. Likewise, the far-aspecular angle or flop viewing angle is conventionally 75° (or 105° or 110°) from the specular angle of reflection. The flash angle and the flop angle are not limited to the geometries described herein. However, in order to directly compare the prime and variants of a particular color code, the angle of flash and the angle of flop are consistent for all the color photographs made for that color code.

FIG. 3 shows a schematic of how the paint images may be depicted on a color monitor 50 according to the present invention. In the depicted embodiment, paint images (digital photographs) of three color variants (A, B and C) are displayed in three rows for flash 52, face 54 and flop 56. The computer software allows the user to rearrange the order of the columns A-C of the paint images to compare the colors side-by-side. FIG. 3 shows three columns of paint images, but this is not meant to be limiting. A greater quantity or lesser quantity of color variants may be displayed depending on the size of the computer monitor, the quantity of selected variants, and the size of the images shown on the computer monitor. In this manner, the user can compare the paint images side-by-side and determine the best match to the vehicle to be repainted, by viewing multiple paint formulations at all three angles at once.

Images of paint colors with special interference color shifts may also be created by photographing the panels in such a way as to allow the angle of the light source to be made steeper or flatter relative to the panel surface. In order to directly compare the prime and variants of particular color code, the flat angle of illumination (such as 45°) and the steep angle of illumination (such as 75° or 110°) are consistent for all the color photographs made for that color code and displayed as depicted in FIG. 4. Color monitor 150 displays three color variants (A, B and C) in two rows for flat angle of illumination (152) and steep angle of illumination 154). The images on display 150 may be modified and/or rearranged as for display 50.

The computer product of the present invention includes a color code searchable computer database that associates color codes with paint formulations. A color code input device is provided to initiate a search in the database for the color code via computer software, and a paint formulation output device is provided to display paint formulations located in the search for the color code. The computer product also includes an image display device configured to display color images of the paint formulations (e.g. formulation panels), where the paint formulation output device and the image display device may be the same device. The computer product of the present invention may include a personal computer, which may be a notebook-sized portable computer. The paint formulation output device and/or the image display device are not particularly restricted but may be any device that can be connected to a computer and is able to display information in color (referred to herein as a computer monitor), for example a cathode ray tube (CRT) or a liquid crystal display (LCD) or other flat panel display device. The image display device may include a color calibration system for calibrating the color of displayed images relative to a standard. In addition, the present invention is suited for use with handheld portable digital assistants (PDAs). The computer monitor of the present invention may include a touch panel type device for operating the color matching product of the invention. In one embodiment, the background 58 to the photographs in rows 52, 54 and 56 is gray or another dark, neutral color. It has been found that a gray (or other dark neutral color) background improves the viewer's ability to assess the colors of the digital photographs as compared to a white or other bright background.

The user selects the paint image that is the best color match to the vehicle being repainted, based on the displayed paint images at multiple viewing angles, e.g. on face and at flash and flop. In one embodiment, the user double clicks on the computer monitor over the desired variant, or otherwise selects a variant, and another screen is projected providing the formulation for the selected variant. Alternatively, the user may look up the formulation for the selected variant in a publication.

It will be readily appreciated by those skilled in the art that modifications may be made to the invention without departing from the concepts disclosed in the forgoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A computer-implemented method of color matching a paint formulation for repairing a vehicle comprising:
   (a) identifying a color code for a vehicle paint;
   (b) selecting a physical color reference chip coated with a paint formulation associated with the color code;
   (c) visually determining a color shift direction between the paint on the vehicle and the color reference chip by placing the color reference chip near to or against a vehicle and viewing the color reference chip at multiple angles;
   (d) searching a computer database for prime and variant paint formulations associated with the color code;
   (e) displaying a list of paint formulations for the color code, and a symbol indicating a color shift direction for each of the formulations versus the prime formulation associated with the color code;
   (f) using the color shift direction to select one or more of the displayed paint formulations;
   (g) simultaneously displaying a plurality of digital photographs of surfaces painted with each of the selected paint formulations taken at either or both of a plurality of viewing angles and a plurality of illumination angles;
   (h) identifying one of the displayed digital photographs that best matches the vehicle paint; and
   (i) identifying the paint formulation for the best matched digital photograph.

2. The method of claim 1, further comprising:
   rearranging the displayed digital photographs by a user for comparison of colors in the digital photographs side-by-side.

3. The method of claim 1, wherein the simultaneously displayed digital photographs of surfaces painted with each of the selected formulations are displayed in columns adjacent each other.

4. The method of claim 3, further comprising:
   rearranging the columns of the simultaneously displayed digital photographs to compare the digital photographs side-by-side.

5. The method of claim 1, wherein an angle of flash and an angle of flop are consistent for all digital photographs associated with the color code.

6. A computer product for color matching a repair paint formulation to a vehicle paint comprising:
   (a) a computer-implemented color code database, the database associating color codes with paint formulations and digital photographs of surfaces painted with the paint formulations;
   (b) a color code input device configured to initiate a search in the database to identify digital photographs of surfaces painted with the paint prime and variant formulations associated with the color code;
   (c) an output device configured to display a list of prime and variant formulations with an indication of color shift direction of the variant formulations with respect to the prime formulation, and configured to simultaneously display a plurality of digital photographs of surfaces painted with each of the selected ones of the displayed formulations associated with the color code taken at either or both of a plurality of viewing angles and a plurality of illumination angles, wherein the selected ones of the prime and variant formulations are selected using the color shift direction.

7. The computer product of claim 6, further comprising:
   (d) computer software comprised of executable instructions stored in the computer product allowing a user to rearrange the digital photographs on the output device for comparison of colors in the digital photographs side-by-side.

8. The computer product of claim 7, wherein the digital photographs are arranged in columns adjacent each other.

9. The computer product of claim 7, wherein an angle of flash and an angle of flop are consistent for all digital photographs associated with the color code.

10. The computer product of claim 7, wherein the output device comprises a display screen.

11. The computer product of claim 10, further comprising color calibration software for calibrating the digital photographs displayed on the display screen.

12. The computer product of claim 10, wherein the display screen's background surrounding the digital photographs is gray.

13. The computer product of claim 10, wherein the sets of digital photographs are rearrangeable on the display screen.

14. The computer product of claim 6, wherein the output device comprises a computer monitor displaying information on the paint formulations.

15. The computer product of claim 14, wherein the information comprises formulation identification, variant type and/or color shift direction.

16. The computer product of claim 15, wherein the paint formulations further include a special variant formulation.

17. A computer-implemented method of color matching a paint formulation for repairing a vehicle comprising:
   (a) identifying a color code for a vehicle paint;
   (b) searching a computer database for prime and variant paint formulations associated with the color code;
   (c) displaying a list of prime and variant paint formulations associated with the color code and a symbol identifying a color shift direction for the displayed formulations;
   (d) using the color shift direction to select one or more of the displayed formulations;
   (e) simultaneously displaying a plurality of digital photographs of surfaces painted with each of the selected formulations, wherein all digital photographs associated with the color code are created with a consistent flat angle of illumination or a consistent steep angle of illumination;
   (f) identifying one of the displayed digital photographs that best matches the vehicle paint; and
   (g) identifying the paint formulation for the best matched digital photograph.

18. The method of claim 17, wherein the digital photographs display the selected formulations at a plurality of viewing angles, including on face, at flash and at flop.

19. The method of claim 17, wherein the digital photographs are displayed at a far-aspecular angle.

* * * * *